United States Patent

Wu et al.

[11] Patent Number: 5,950,618
[45] Date of Patent: Sep. 14, 1999

[54] SOLAR ENERGY BAKING APPARATUS

[75] Inventors: Wei-Yih Wu; Yang-Yih Hu; Tien-Yuan Li; Jennchen Tang; Ting-An Li, all of Hsinchu, Taiwan

[73] Assignee: Industrial Technology Research Institute, Hsinchu, Taiwan

[21] Appl. No.: 09/107,999

[22] Filed: Jun. 30, 1998

[51] Int. Cl.$^6$ ............................................. F24J 2/02
[52] U.S. Cl. ........................ 126/596; 126/600; 126/681; 126/701; 34/93
[58] Field of Search ................................. 126/599, 600, 126/652, 657, 687, 680, 681, 694, 701, 693; 34/93, 522

[56] References Cited

U.S. PATENT DOCUMENTS

| | | | |
|---|---|---|---|
| 2,994,318 | 8/1961 | Lee | 126/681 |
| 4,129,120 | 12/1978 | Saunders | 126/585 |
| 4,387,961 | 6/1983 | Winston | 126/690 |
| 4,442,828 | 4/1984 | Takeuchi et al. | 126/681 |
| 4,471,763 | 9/1984 | Moravnik | 126/687 |
| 4,628,142 | 12/1986 | Hashizume | 126/694 |
| 4,632,091 | 12/1986 | Wiens | 126/694 |
| 5,676,128 | 10/1997 | Cowart | 126/681 |

Primary Examiner—Ira S. Lazarus
Assistant Examiner—Sara Raab
Attorney, Agent, or Firm—Pollock, Vande Sande & Amernick, R.L.L.P.

[57] ABSTRACT

A solar energy baking apparatus comprises one or more baking containers for receiving material to be baked or dried; reflectors with respect to the baking containers for reflecting solar energy and collecting and focusing the light on the baking containers; and a driving device for moving the reflectors to locate above or below the baking container. The present device may be used to set the baking temperature and the operating time. Through monitoring the controlling device, two driving devices are controlled respectively for operating the baking container, and for causing the reflectors to move to the lower portion of the baking container for reflecting and collecting solar energy, or rotate to the upper portion of the baking container so as to prevent the solar energy to radiate the baking containers. Thus the baking temperature and time are controlled and the process of baking by solar energy is improved.

21 Claims, 5 Drawing Sheets

SOLAR ENERGY BAKING APPARATUS

BACKGROUND OF THE INVENTION

1. Field of the Invention

The present invention is related to a solar energy baking apparatus, especially to a solar energy baking device for automatically preventing an extreme baking temperature. This invention's function is for baking fruit, food, tea, or any commodity wherein the objective is to reduce the moisture content through the use of solar energy.

For the purpose of this application, we shall utilize as an example the baking of tea.

2. References on Related Prior Art

The objective in baking tea is to control the baking temperature within a proper range so as to reduce the moisture content of the tea leaves. In the process, proper control of the temperature will cause the tea to generate a special fragrance. In baking tea by solar energy, a key issue is preventing an extreme baking temperature. The means of controlling the temperature is also very important.

The conventional tea baking apparatus include either an electric heater baking apparatus or a coal energy baking apparatus. However, all of them use costly energy, waste natural resources, and contribute to pollution.

Accordingly, the present inventors have researched solar energy baking devices by using vacuum solar energy heat collectors during work at the Energy and Resource Laboratories, Industrial Technology Research Institute, Taiwan, and a previous invention has been awarded a patent, Taiwan Patent No. 111930, September, 1996.

The solar energy baking apparatus includes a solar energy heat collector, photoelectric elements, D. C. deceleration motor, and a driving device. The tea is located within the inner tubes of the baking containers. Through selective coating adhered to the outer surface of the inner tube, solar radiation thermal energy may be absorbed for baking tea.

In the baking apparatus, the deceleration motor driven by photoelectric elements will drive the baking containers to rotate so that the tea within the tube will be heated uniformly. Thus, the tea quality may be retained. The vacuum heat isolation layer effectively prevents heat loss, so that the whole baking process is more rapid and energy saving.

However, the temperature within the baking containers of Taiwan Patent No. 111930 will oscillate with the variation of solar radiation, therefore, the temperature during baking can not be controlled. Moreover, since the baking time can not be controlled, the quality of baking is unsteady.

According to the Taiwan Tea Experiment Station, if tea is baked for four to six hours in 100° C., or two to four hours in 120° C., the tea will generate a fragrant smell and the quality of low class tea will be improved. The preferred baking temperature of tea is 120° C. If the baking temperature is over 150° C., the tea is easily burned. Therefore, it is imperative to control both the temperature and time in the baking of tea leaves.

SUMMARY OF THE INVENTION

Accordingly, the object of the present invention is to provide a solar energy baking apparatus having a reflector for reflecting or shielding solar energy, and having the effect of collecting solar energy and having the function of preventing extreme temperatures.

Another object of the present invention is to provide an automatically operated solar energy baking apparatus having reflectors with the function of reflecting or shielding solar energy, which enables control of the baking (baking) temperature and time. It is preferable that the baking container is, in the present invention, a solar energy heat collector, especially a solar energy vacuum heat collector. The reflectors are further added to each of the vacuum solar energy baking containers, and controlled by the temperature sensing controller and timer.

When the reflectors are located below the baking containers, the heat collecting efficiency within the vacuum baking containers can be increased by the solar energy reflection and focalization of the reflectors. In the baking process of the present invention, when the baking temperature within the inner tubes has attained a preset value, as detected by the temperature-sensing controller, a control signal will be transferred to a motor. Thus, the reflectors will move to cover the vacuum baking containers, thereby shielding the solar energy so as to prevent the temperature within the inner tube from increasing beyond the optimal temperature for baking. Additionally, the reflector may be operated manually so that it may be rotated to be above or below the baking container.

When the temperature decreases to be below a preset value, the temperature-sensing controller will cause the motor to drive the reflectors so that the reflectors will move back to below the collector position for increasing the temperature through solar radiation absorption. Further, when the baking time has attained a preset time for the baking process, the timer will cause the motor to actuate, and the reflectors to turn to cover the baking container. Now, the baking process is completed. Unless the reflector is reset again, the reflectors will remain in this position. The reflectors also serve to protect the baking container tubes from damage through impact when covering the top side of the tubes.

Two different motors drive the reflectors and the baking containers; thus a primary switch only controls the power of the motor to the baking containers. Only after the baking process is completed and the tea leaves poured out, is the switch closed. Therefore, during the baking process, the tea is prevented from burning since the baking containers will not stop rotating. The reflector and the baking container also use a planetary gear, or the planetary gear and an idler gear are interacted by driving the motor.

In the present invention, the solar energy photoelectric element is used to supply power to motor. However, a battery may also be added so as to maintain a steady power supply and increase the power storing efficiency. Therefore, the control system will not only be effected by solar energy but also a steady and continuous power supply will be maintained. On the other hand, commercial A. C. Electricity supply can be used as an alternative.

The present invention may be used with a switching device for switching to the generally used alternative current, so that the user may select to use solar energy or the alternative current.

BRIEF DESCRIPTION OF THE DRAWINGS

The present invention will be better understood and it's numerous objects and advantages will become apparent to those skilled in the art by referencing to the following drawings in which.

DETAILED DESCRIPTION OF THE PREFERRED EMBODIMENT

Figure 1:
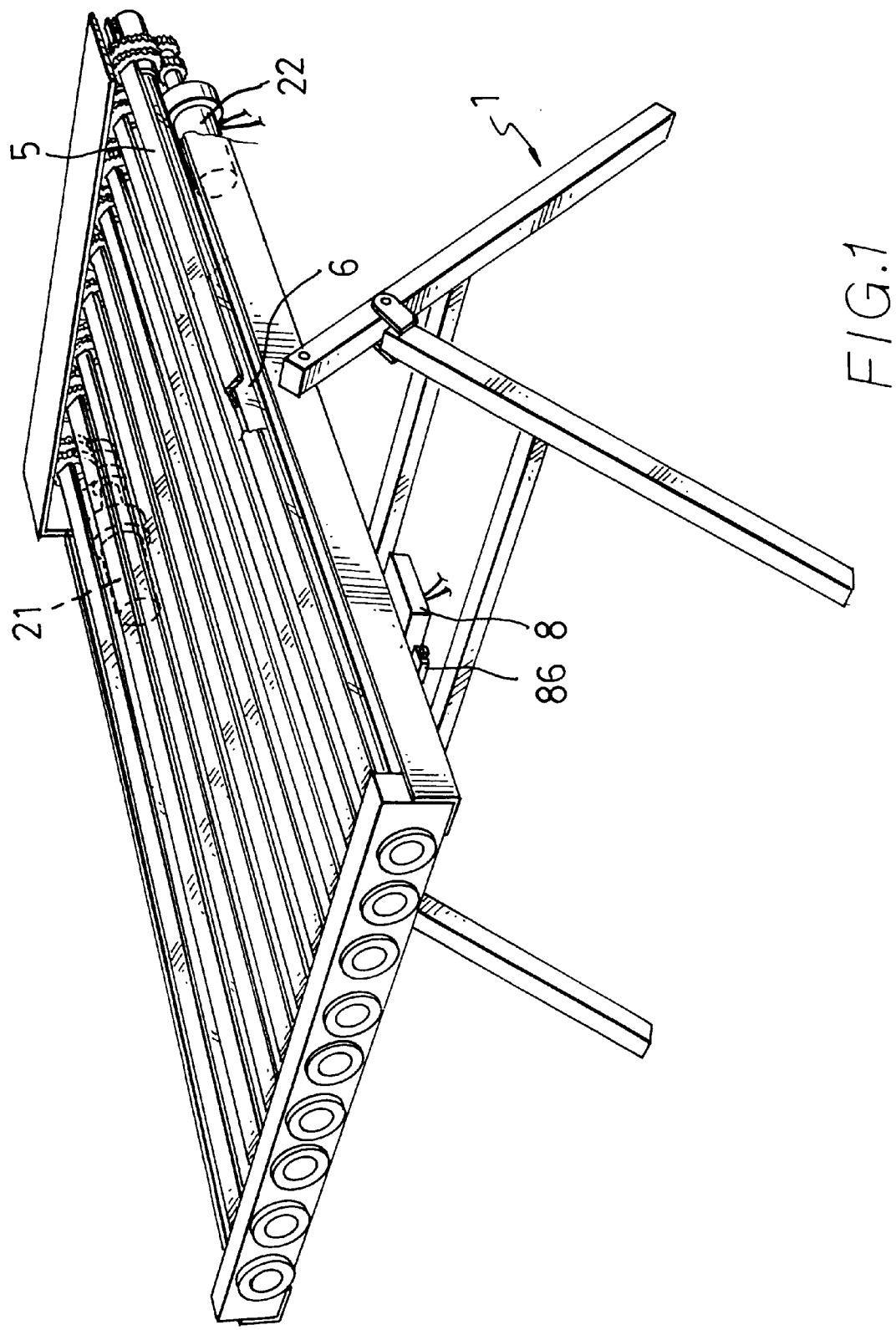
FIG. 1 is a perspective view of the solar energy baking apparatus of the present invention.

As shown in FIG. 1, and referring to FIGS. 3 to 5, the solar energy baking apparatus comprises a baking container (6) for locating a baking object; a reflector (5) installed near on the baking container (6) and opposite therewith, and preferably located below the baking container (6) for reflecting solar energy or collecting solar energy within the baking container (6); and a driving device (2) for driving the reflector (5) so to move to be above or below the baking container. A supporting frame (1) and the baking container (6) may be swung or rotated thereon to support the baking container (6). Preferably, the baking container (6) is a solar energy heat collector, especially a solar energy vacuum heat collector, and the reflector is a reflecting plate. The preferred embodiment of the present invention is used to bake or dry tea. Of course, this invention may also function for baking some fruit, food, tea or any commodity where in the objective is to reduce the moisture content through the use of solar energy. In order to bake or dry a large amount of tea, in the present invention, multiple sets of baking containers (6) and reflectors (5) may be assembled.

It is preferable that the baking containers (6) of the baking device are formed by double concentric tubes, wherein the outer tube (62) is a transparent tube and may transmit solar energy; and it is preferably that the inner tube (61) is a metal round tube, and a selective coating (63) is on the outer surface thereof. Other than absorbing solar radiation energy transmitted through the outer layer (62) to convert into thermal energy, the selective coating (63) also releases infrared radiation. The selective coating is preferably $Al_2O_3$, Al, $Cu_2SO_4$, or a composition of $SiO_2$ and Cu. A vacuum heat isolation layer (64) is preferable between the double concentric tubes so as to prevent the thermal energy from dissipating after the inner layer has absorbed solar radiation energy. As shown in FIG. 3, the baking container (6) has an opening (65) for receiving tea or other baking (baking) product or material. The opening (65) is sealed by a cover (66).

The driving device (2) includes a first driving device (21) and a second driving device (22). The first driving device (21) is used to drive the solar energy baking container (6) as to rotate continuously, and the second driving device (22) is used to drive the reflector (5) so that it may move to be above the solar energy baking container from being below the solar energy baking container (6) so as to shield and prevent solar energy from radiating the baking container (6). Preferably, the first and second driving devices (21) and (22) are D. C. deceleration motors. The present invention also uses a planetary gear driven by a motor, or the planetary gear and an idler gear which are interacted by driving the motor.

Figure 3:
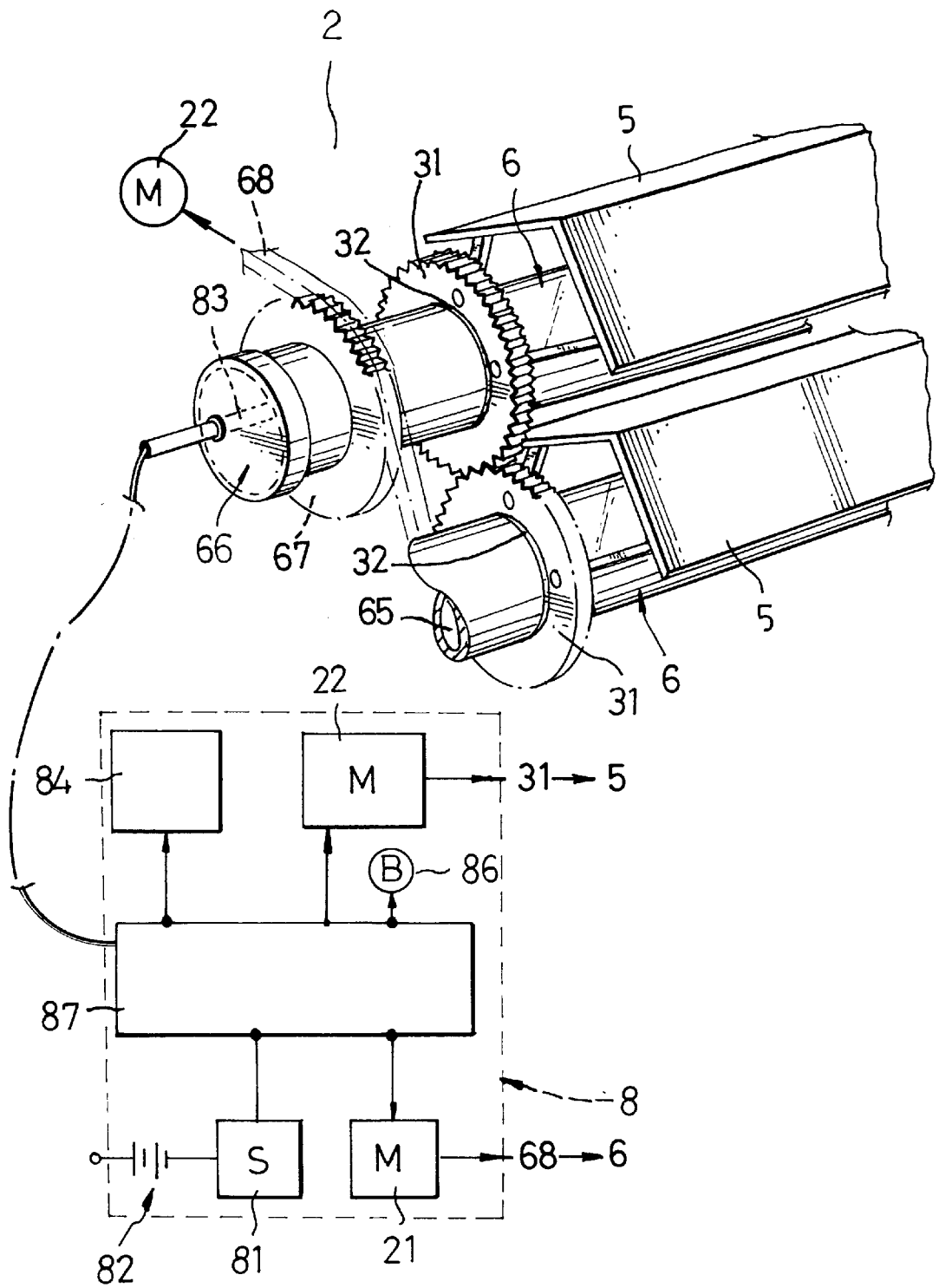
FIG. 3 is a partial perspective view showing the operation of the baking containers and the reflectors of the present invention.

Referring now to FIG. 3, the first driving device (21) is used to drive the solar energy baking container to rotate continuously by a first transmission element which includes a gear (67) and a belt (68) (or is driven directly by a gear set), and the second driving device (22) is used to drive the reflector (5) to rotate by the transmission of a second transmission element which is a gear set (31). The solar energy baking container (6) is driven to rotate by the first transmission element of the first driving device (21). The powers of second transmission element and the first transmission element are split by a bearing (32).

FIG. 1 shows the solar energy baking apparatus of the present invention. In this embodiment, the baking apparatus is compact (light, thin, short and small) and has ten solar energy baking containers (6) with a length of 120 cm and an outer diameter of 45 cm so that the whole area is smaller than 1.5 meter square. The weight thereof may be carried easily by two adults, and the supporting frame thereof may be folded. Thus the baking container of the present invention has a simple structure, requires less maintenance and is easy to be transported.

Moreover, the solar energy baking apparatus of the present invention may be controlled to operate by a control device, as shown in FIG. 3. The control device (8) has a CPU device (87) which has a programmable control unit for controlling the first driving device (21) and the second driving device (22) so as to drive the solar energy baking container (6) and the reflector (5) to rotate respectively; a power supply (81) for supplying power to the CPU device (87), and the first and second driving devices (21) and (22). The control device (8) may be installed on the supporting frame (1).

The control device (8) includes a temperature sensor (83) installed on the cover for measuring the temperature of the inner tube (61) and outputting a signal to the CPU device (87); a controller (84) for operating the temperature and time setting to the CPU device (87) for driving the driving device. Preferably, it may further include a buzzer (86). When the time is up or initiated, the buzzer may buzz to inform the operator. Or, when temperature is too high or too low, the buzzer may inform the operator too. The buzzer (86) may also be installed on the controller (84). A display is installed on the controller (84) for displaying the current operating condition.

The temperature sensor (83) is arranged within the inner tube (61) of the vacuum baking container for measuring the inner tube (61) baking temperature, and outputting signal to the CPU device (87) at any time. When the CPU device (87) has received the temperature signal outputted by the temperature sensor (83), then the temperature will be compared with the set temperature in the CPU device (87). When it is higher than the set temperature, then a signal is outputted to drive the reflector to move to be above the solar energy baking container (6).

The controller (84) has a time setting function by which a set time may be inputted to the CPU device (87) for counting the baking operation time and controlling the baking process. When the time has attained an initial set value for performing the baking process, the CPU device (87) outputs a signal for triggering the driving device (2) to operate and the buzzer (86) will sound to inform the operator that the baking apparatus has actuated. When the process has attained a set time for ending the baking process, the CPU device (87) will output a signal for triggering the reflector driving (22) device to stop and the buzzer sounds to inform the operator that the baking apparatus has stopped. The counter operates within the CPU device (87).

The vacuum baking containers (6) rotate continuously by the motor (22) until the main power supply has been interrupted by the operator. Thus, the tubes may rotate continuously, preventing the tea from burning, adversely affecting the baking quality.

Figure 4:
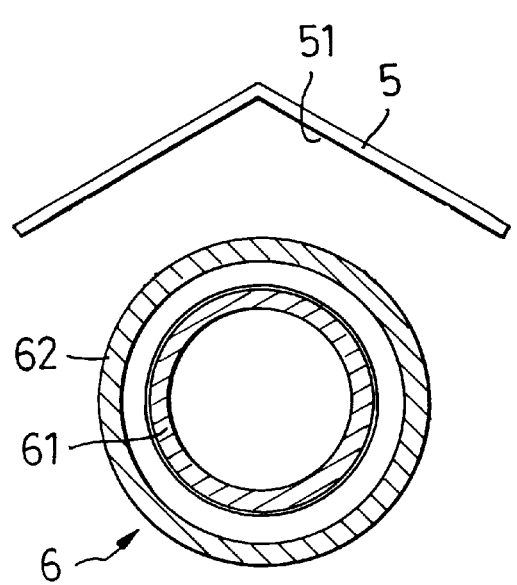
FIG. 4 is a schematic view of the baking containers and the reflectors of the present invention.
Figure 5:
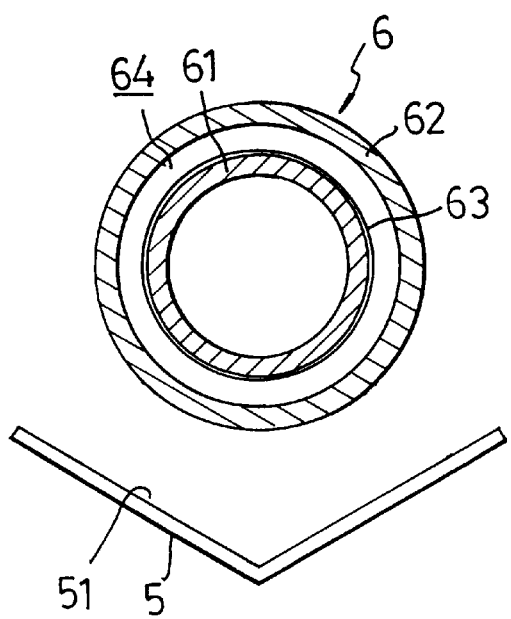
FIG. 5 is similar to FIG. 4, but shows the reflected solar energy and the light is focused on the baking containers.

The typical operation of the present invention is shown in FIG. 4. When the temperature within the baking containers rises above a preset value, the reflector (5) will be driven to locate above the baking container (6) by the second driving device, preventing solar energy from radiating to the baking container (6) continuously. Moreover, when the temperature drops below a preset value, as shown in FIG. 5, then the reflector (5) will be moved to be located below the baking container (6), reflecting the solar energy and focusing sunlight on the baking container (6). It is preferably that the power supply (81) of the present invention is a solar energy photoelectric element for supplying the necessary power to the motors (21, 22). Another steady power supply may be further added, for example, a battery (82) for sustaining a steady power supply and increasing the storing efficiency of the solar power supply. Then the whole control system will not be effected by solar energy, thus it may be operated continuously. That is, the solar energy is first converted to electric energy to be stored in the battery (82), and then the electric energy is released for driving the motors. Moreover, the power supply of the present invention may be connected with a switching device for A. C. current, so that user may select to use solar energy or A. C. electric power, thus the present invention has a steady power supply.

Figure 6:
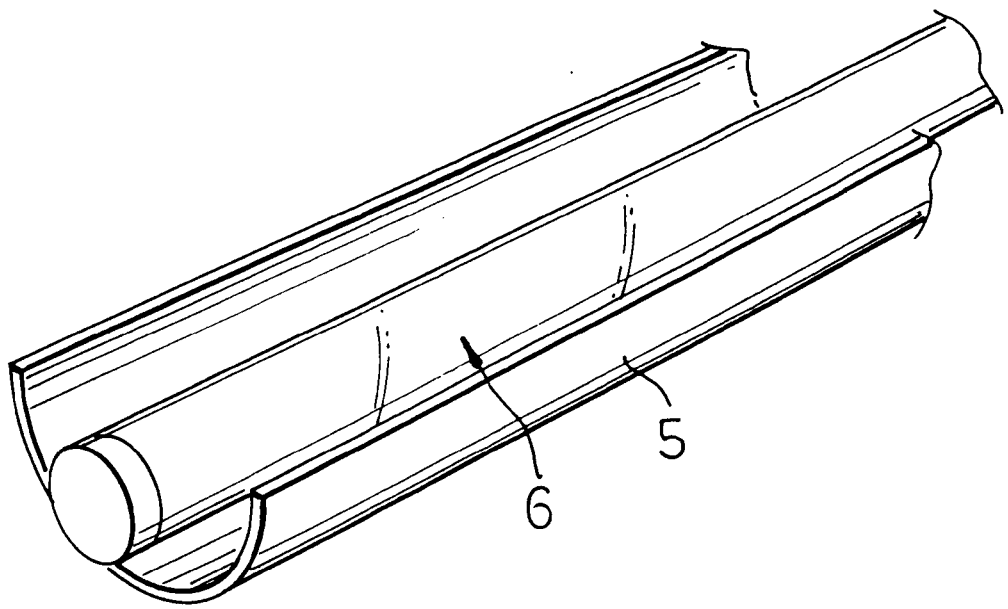
FIG. 6 is a partial perspective view of the reflector embodiment of the present invention.
Figure 7:
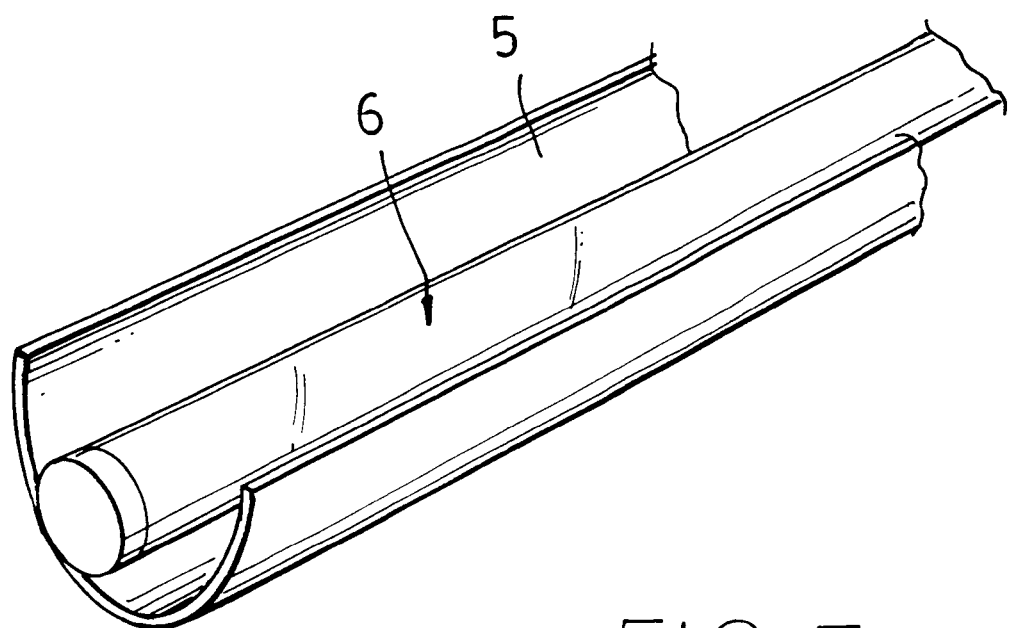
FIG. 7 is similar to FIG. 6, but another embodiment is shown.

The design of the reflector (5), as shown in FIGS. 3 to 7, is a reflecting plate, and the shape of the reflector (5) in section is a general slot type structure, the inner surface of the reflector (5) (i.e. Reflecting surface) being adhered by or formed as a thin coating with high reflectivity. A preferable reflector (5) is shown in FIG. 6 and has a semicircular cylindrical structure in section, or a parabolic surface structure, preferably as that shown in FIG. 7, a compound parabolic shape, or any shape having excellent focusing effect, with inner surface as above.

Figure 2:
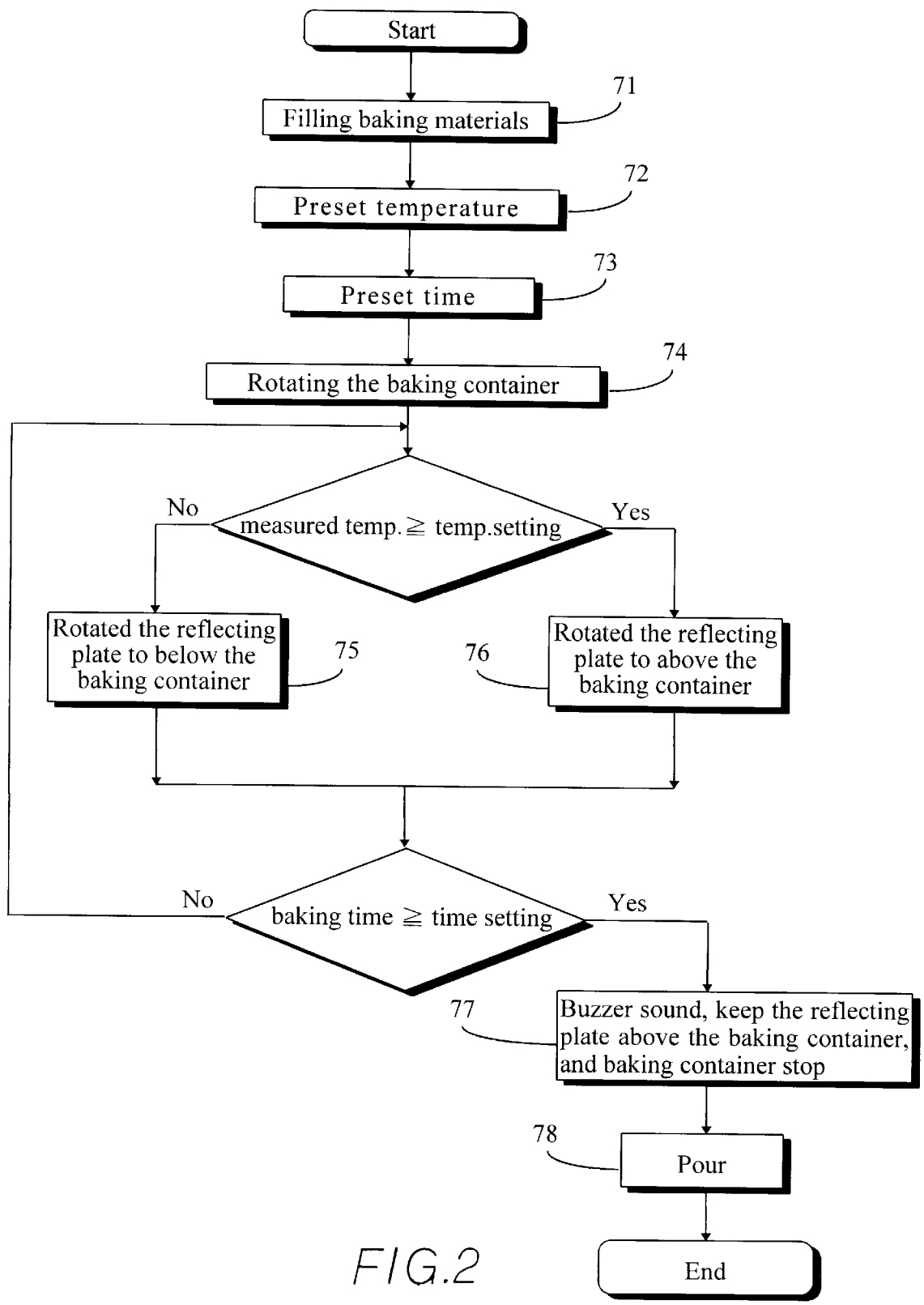
FIG. 2 is a flow diagram of the automatic control embodiment of the present invention.

FIG. 2 shows a control process embodiment for baking, i.e. the programmable control process within the CPU device (87). As the baking process is started, the baker puts a fixed amount of tea into the baking container (6) according to baker's experience and requirement (block 71) and then the baking temperature (block 72) and time (block 73) are set within the CPU device (87) (block 73). Next, the baking containers (6) with the reflectors (5) located above are actuated to rotate (block 74). From now on, throughout the whole baking process, the baking containers (6) rotate continuously until the baking process is completed. When the measured temperature of the baking container (6) is lower than the set temperature in the CPU device (87), it is recorded that the absorbed solar energy within the tube (6) is not sufficient. Then, the reflectors (5) will not move so as to reflect solar energy continuously in order that the temperature within the tube (6) may be increased (block 75). When the measured temperature within the tube (6) is greater than or equal to the set temperature in the CPU device (87) (block 76), then the CPU device (87) outputs a signal to the second driving device (22) for driving the reflector (5) to rotate to be above the baking container (6) for shielding the solar energy so as not to radiate the baking container continuously. Thus, the temperature within the tube will not increase continuously and the temperature may be controlled within the set range. Therefore, according to the strength of the solar energy, the reflector (5) of the present invention may be controlled repeatedly so as to rotate and move its position. In block (77), when the elapsed baking time is smaller than the time set by the CPU device (87), the baking process is performed continuously. When the elapsed baking time is equal to or larger than the set value in the CPU device (87), then it is displayed that the batch of tea has been baked, the buzzer will sound (block 77), and the reflector plates (5) will cover the baking container (6). In order that the next time, the baking process may be performed successfully, the reflectors (5) may be manually driven to be below the baking container (6). Lastly, the baking container tubes (6) are stopped and the tea is poured out, thus completing the solar energy baking process (block 78).

Although certain preferred embodiment of the present invention has been shown and described in detail, it should be understood that various changes and modifications might be made therein without departing from the scope of the appended claims.

What is claimed is:

1. A solar energy baking apparatus comprising:
   a baking container comprised of a vacuum solar energy heat collector;
   a reflector installed near said baking container and reflecting solar energy onto said baking container; and
   a driving device for moving said reflector for following said solar energy and reflecting onto said baking container, said driving device comprising a first driving device and a second driving device, wherein said first driving device is used for driving said baking container to rotate continuously; and said second driving device is used for driving said reflector to move from being below said solar energy heat collector to be above said solar energy heat collector.

2. The baking apparatus as recited in claim 1, wherein said heat collector consists of a transparent outer tube and an inner tube which are concentric, and a vacuum heat isolation layer is formed between said outer tube and said inner tube.

3. The baking apparatus as recited in claim 2, wherein said heat collector has a double layer concentric round tube.

4. The baking apparatus as recited in claim 3, wherein said inner tube is a metal round tube.

5. The baking apparatus as recited in claim 3, wherein a selective coating is adhered on said outer surface of said inner tube, said selective coating being capable of absorbing and releasing infrared rays.

6. The baking apparatus as recited in claim 3, wherein said solar energy heat collector has an opening which is installed with a cover for sealing said opening.

7. The baking apparatus as recited in claim 1, wherein said first driving device further includes a first transmission element for transferring power to said heat collector, while said second driving device further includes a second transmission element for transferring power to said reflector.

8. The baking apparatus as recited in claim 7, wherein said first transmission element include a gear and a belt for transferring power, while said second transmission element is a gear set for transferring power, and a bearing is installed between said gear of said second transmission element and said heat collector.

9. The baking apparatus as recited in claim 1, wherein said solar energy baking apparatus is supported by a supporting frame.

10. The baking apparatus as recited in claim 9, wherein said supporting frame is installed with a control device for controlling said operation of said solar energy baking apparatus.

11. The baking apparatus as recited in claim 10, wherein said control device includes a CPU device having a programmable control unit for controlling said solar energy baking apparatus; and a power supply for supplying power to said control device.

12. The baking apparatus as recited in claim 11, wherein said power supply is a solar energy photoelectric element.

13. The baking apparatus as recited in claim 11, wherein said heat collector consists of a transparent outer tube and an inner tube which are concentric, and a vacuum heat isolation layer is formed between said outer tube and said inner tube and wherein there is a cover for said baking container; said control device further including a temperature sensor installed on said cover for measuring the temperature of said inner tube and outputting a signal to said CPU device; and a controller for operating in correspondence with a set temperature and time in said CPU device so to drive said driving device.

14. The baking apparatus as recited in claim 13, wherein said controller is installed with a timer.

15. The baking apparatus as recited in claim 13, including a plurality of said baking containers and a plurality of said reflectors.

16. The baking apparatus as recited in claim 1, wherein said reflector is a reflecting plate.

17. The baking apparatus as recited in claim 1, wherein said reflector in section is formed by a structure of compound parabolic surface.

18. The baking apparatus as recited in claim 1, wherein said reflector in section is formed by a structure of semicircular cylinder.

19. The baking apparatus as recited in claim 1, wherein said reflector in section is formed by a structure of parabolic surface.

20. The baking apparatus as recited in claim 1, wherein said inner surface of said reflector is coated with a thin coating material for reflecting.

21. The baking apparatus as recited in claim 1, including a plurality of said baking containers and a plurality of said reflectors.

* * * * *